Figure 1:
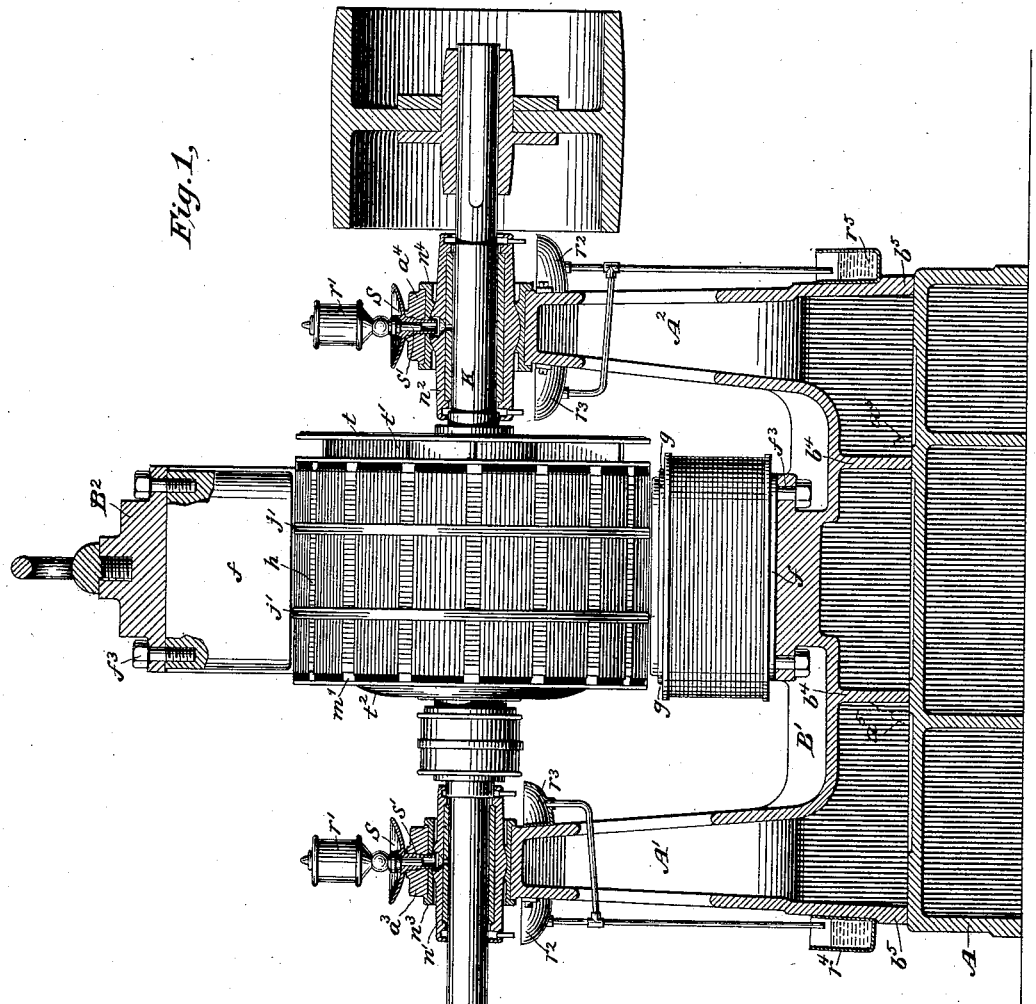

(No Model.) 6 Sheets—Sheet 1.

G. WESTINGHOUSE, Jr., H. M. BYLLESBY,
O. B. SHALLENBERGER, A. SCHMID & B. HARTLEY.
DYNAMO ELECTRIC MACHINE.

No. 374,858. Patented Dec. 13, 1887.

Witnesses
Geo. W. Breck
Carrie E. Ashley

Inventors
Geo. Westinghouse Jr.
Henry M. Byllesby
O. B. Shallenberger
Albert Schmid
Bernard Hartley By their Attorneys
Pope & Edgcomb

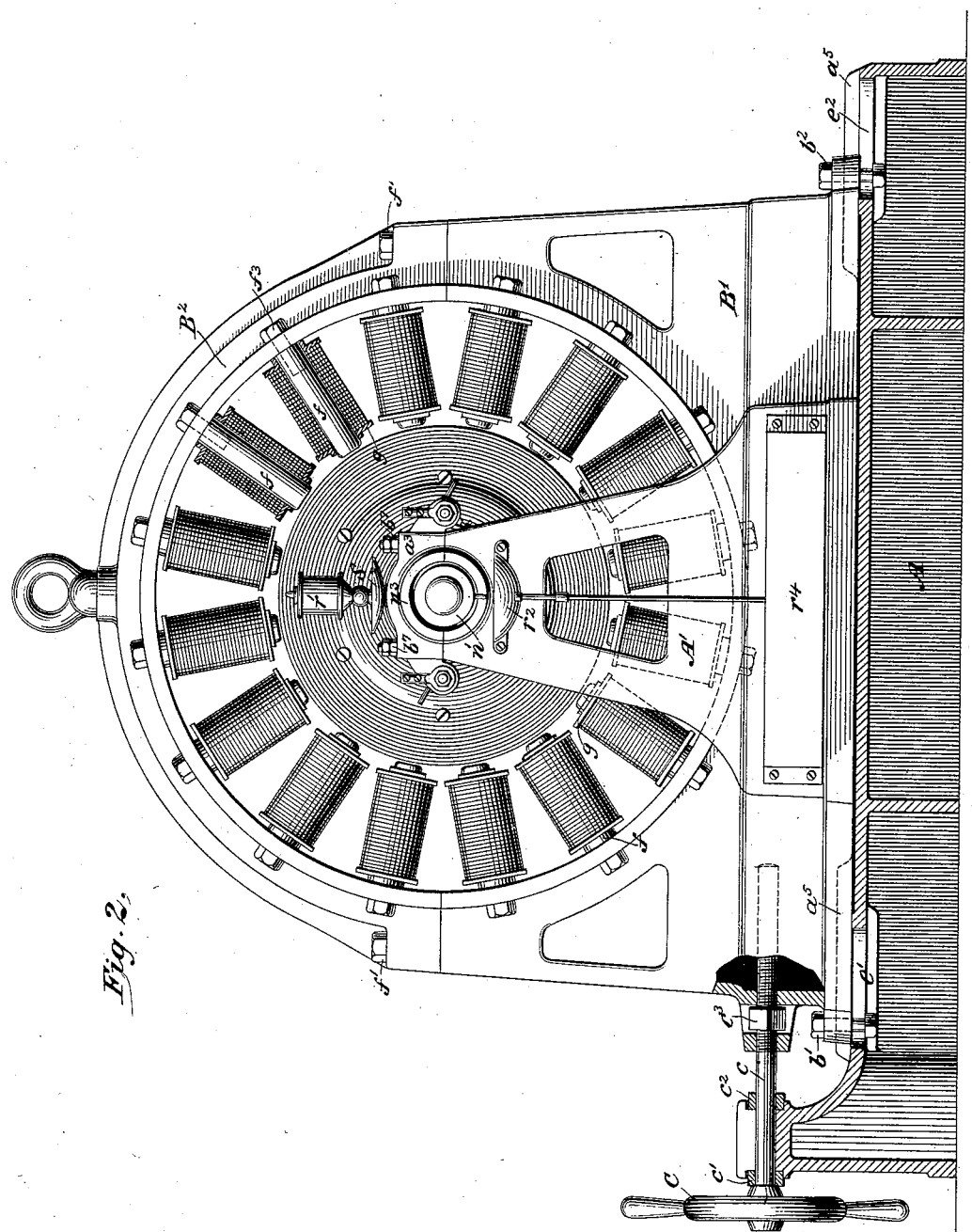

(No Model.) 6 Sheets—Sheet 3.
G. WESTINGHOUSE, Jr., H. M. BYLLESBY, O. B. SHALLENBERGER, A. SCHMID & B. HARTLEY.
DYNAMO ELECTRIC MACHINE.
No. 374,858. Patented Dec. 13, 1887.
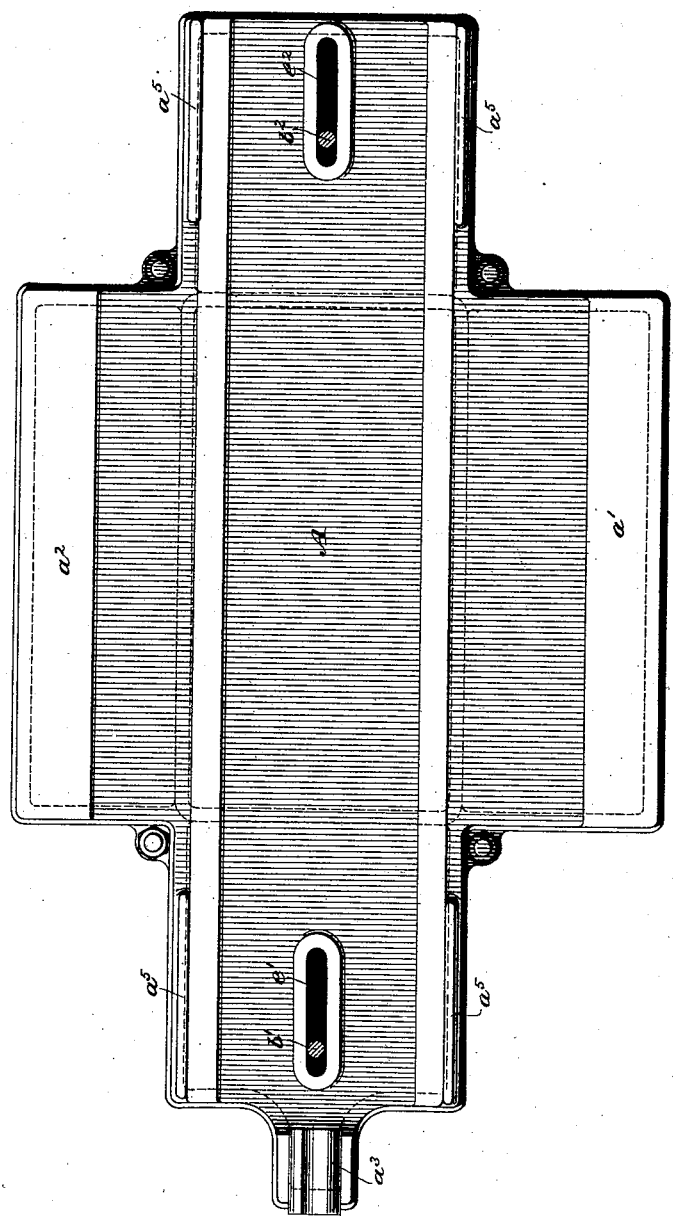

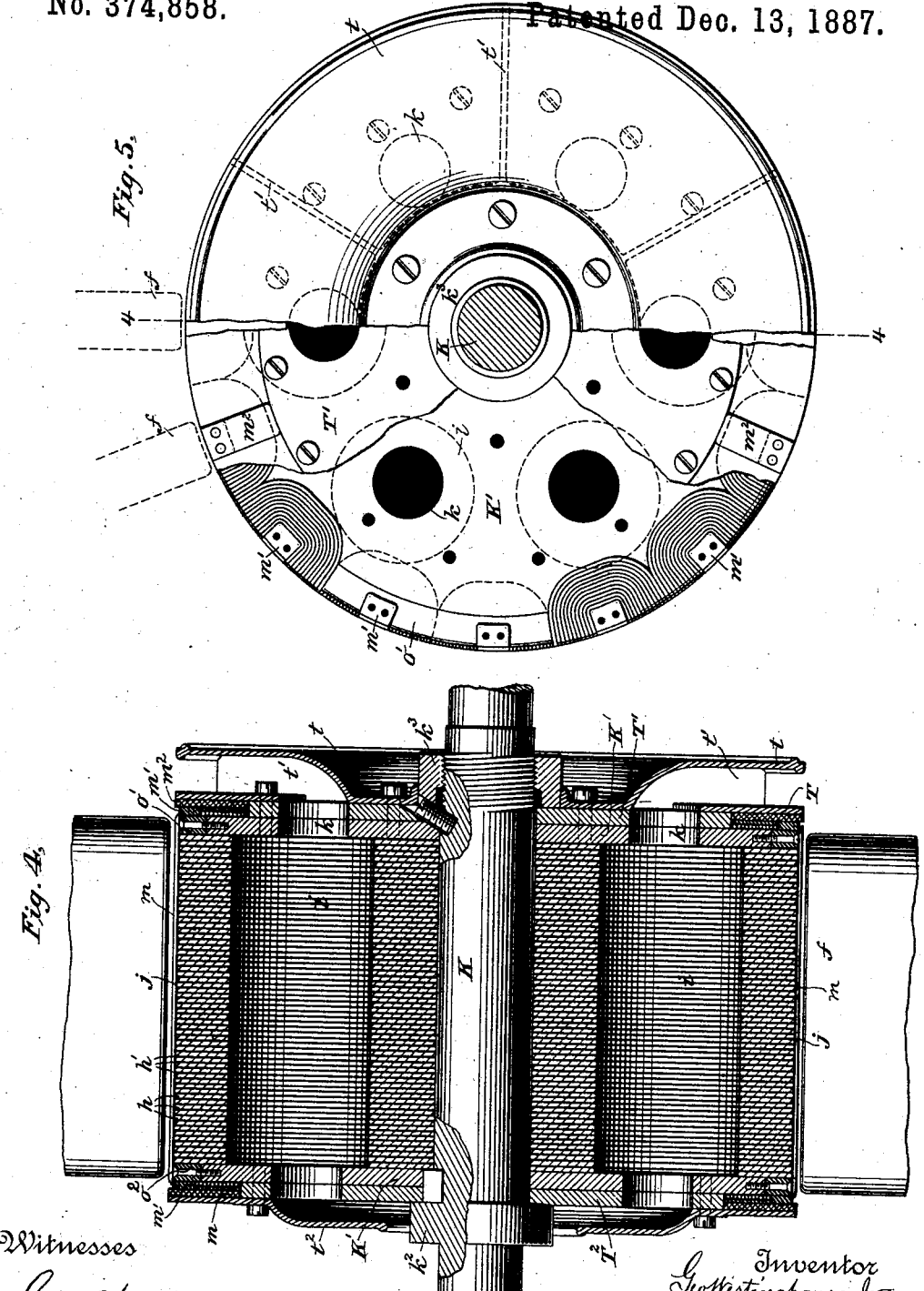

(No Model.) 6 Sheets—Sheet 5.

G. WESTINGHOUSE, Jr., H. M. BYLLESBY,
O. B. SHALLENBERGER, A. SCHMID & B. HARTLEY.
DYNAMO ELECTRIC MACHINE.

No. 374,858. Patented Dec. 13, 1887.

(No Model.) 6 Sheets—Sheet 6.
G. WESTINGHOUSE, Jr., H. M. BYLLESBY,
O. B. SHALLENBERGER, A. SCHMID & B. HARTLEY.
DYNAMO ELECTRIC MACHINE.
No. 374,858. Patented Dec. 13, 1887.
Fig. 7,
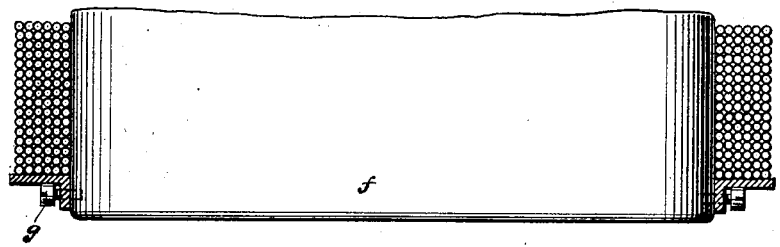
Fig. 8,
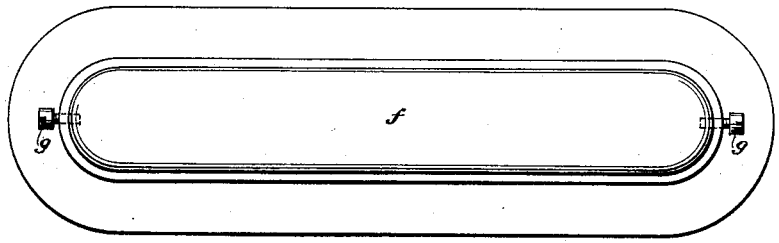
Witnesses
Geo. W. Breck
Carrie E. Ashley
By their Attorneys
Pope & Edgcomb,
Inventor
Geo. Westinghouse Jr.
Henry M. Byllesby
O. B. Shallenberger
Albert Schmid
Bernard Hartley

UNITED STATES PATENT OFFICE.

GEORGE WESTINGHOUSE, JR., AND HENRY M. BYLLESBY, OF PITTSBURG, OLIVER B. SHALLENBERGER, OF ROCHESTER, ALBERT SCHMID, OF ALLEGHENY, AND BERNARD HARTLEY, OF PITTSBURG, PENNSYLVANIA; SAID BYLLESBY, SHALLENBERGER, SCHMID, AND HARTLEY ASSIGNORS TO SAID WESTINGHOUSE.

DYNAMO-ELECTRIC MACHINE.

SPECIFICATION forming part of Letters Patent No. 374,858, dated December 13, 1887.

Application filed December 31, 1886. Serial No. 223,099. (No model.)

*To all whom it may concern:*

Be it known that we, GEORGE WESTINGHOUSE, Jr., and HENRY M. BYLLESBY, citizens of the United States, residing in Pittsburg, in the county of Allegheny, OLIVER B. SHALLENBERGER, a citizen of the United States, residing in Rochester, Beaver county, ALBERT SCHMID, a citizen of the Republic of Switzerland, residing in Allegheny, Allegheny county, and BERNARD HARTLEY, a subject of the Queen of Great Britain, residing in Pittsburg, Allegheny county, all in the State of Pennsylvania, have invented certain new and useful Improvements in Electric Generators, of which the following is a specification.

The invention relates to the class of apparatus employed for producing alternate electric currents.

The object of the invention is to provide a simple form of machine for producing alternating electric currents, and one which shall have but few parts, and those so related as to be easily put together in constructing the machine and capable of being readily removed and replaced.

Certain features of the invention are applicable to other forms of generators than those delivering alternate currents.

The invention involves many details of construction relating to the frame-work of the machine, the bed-plate upon which it rests, a device for adjusting the position of the frame upon the bed-plate for the purpose of modifying the tension of the driving-belt, the construction of the pole-pieces, the mounting of the armature, and various other details which will be described in connection with the accompanying drawings.

In an application of even date herewith, filed by Albert Schmid, there is described a generator involving many of the features described herein, claims being made therein more especially upon the field-magnet, bearings, and bed-plate. The present case relates more particularly to the armature.

Figure 6:
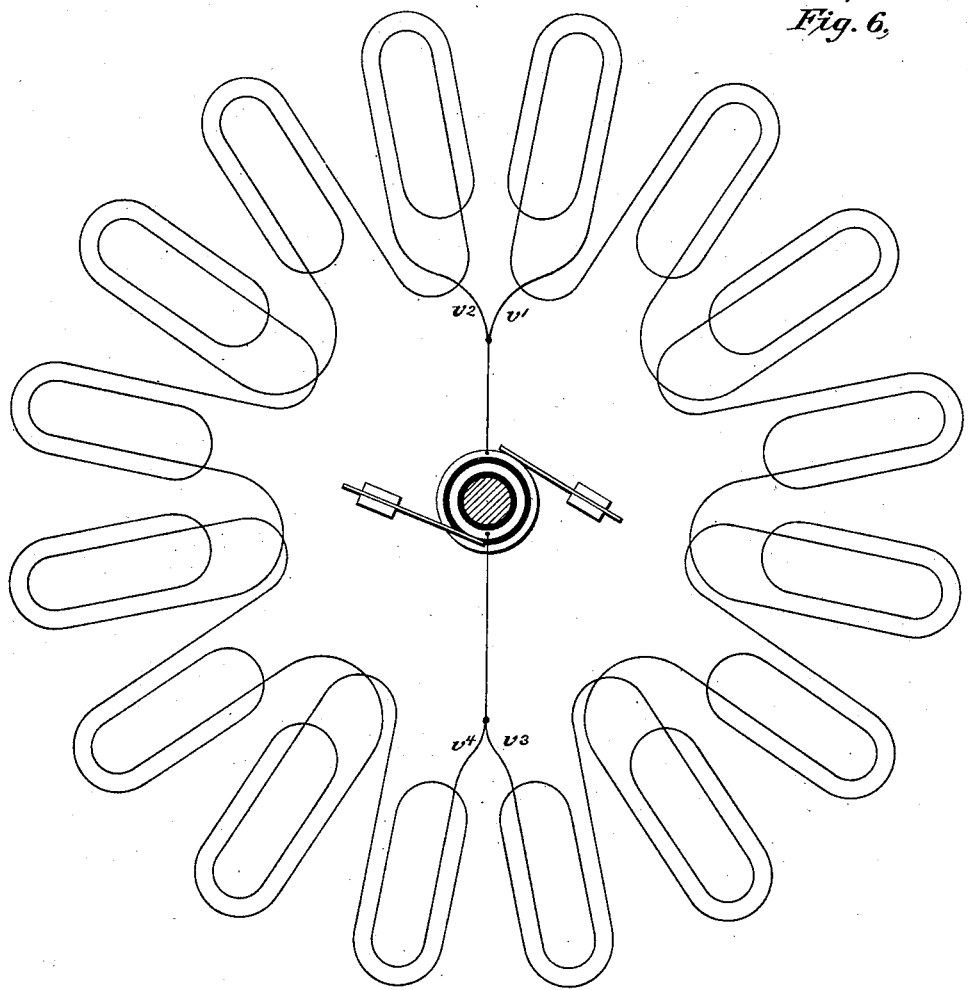

In the drawings, Figure 1 is a transverse section of the machine, and Fig. 2 is a side view of the same. Fig. 3 is a plan of the bed-plate. Fig. 4 is an enlarged section of the armature. Fig. 5 is an enlarged end view of the armature, partly in section; and Fig. 6 is a diagram showing a method of winding the armature. Figs. 7 and 8 are enlarged views of one of the field-magnet cores.

Referring to the figures, A represents the bed-plate upon which the machine rests. This bed-plate, instead of being of wood, as has been the usual construction, is formed of a single piece of cast-iron. The form of the bed-plate is rectangular, having lateral projections $a'$ and $a^2$, upon which the bearings A' A² for the armature rest. These bearings constitute portions of a casting, B', which comprises the lower half of the field-magnet plate for the machine. This casting rests upon the bed-plate, and is held in position by bolts $b'$ $b^2$ passing through slots $e'$ and $e^2$ in the bed-plate. The position of the casting, and thus of the entire machine upon the bed-plate, may thus be adjusted, since the bolts may move along in the slots. For the purpose of readily adjusting this position, a wheel, C, is carried upon a shaft, $c$, extending through and bearing in one end of the bed-plate A. This shaft is held in position by collars $c'$ $c^2$, and is threaded at its end and turns in a nut, $c^3$, in the casting B'. By turning the sprocket-wheel in one direction or the other, the position of the machine is readily modified. This is of advantage when several machines are belted to a single shaft, for the reason that it becomes necessary to carefully adjust the tension of the belts of each machine.

For the purpose of allowing the machine to be moved easily upon the bed-plate, the casting B' is constructed with flanges or webs $b^4$ $b^4$ and $b^5$ $b^5$, which rest upon corresponding rails formed upon the bed-plate. Webs or lugs $a^5$ $a^5$ are formed upon the bed-plate for guiding the webs $b^4$ $b^4$.

The casting B' is designed to contain approximately half of the core projections $f$ $f$. The remainder of these projections are carried by another section, B², constituting the upper portion of the field-magnet frame. Formerly it has been proposed to cast the entire frame in one piece. Such construction, however, is disadvantageous, for the reason that it is impossible to remove the armature without first removing the bearings and supports for one end of the armature. By constructing the upper half separately, this half may be removed and the armature lifted from its bearings. The two parts are bolted together, as shown at $f'f'$. The cores may be formed integral with the field-magnet frame, and then be of cast-iron; but it is preferred to make them of wrought-iron and to secure them in position by means of bolts or screws $f^3 f^3$. The inner ends of these pole-pieces or cores are constructed with re-entrant curves having a radius approximately the same as that of the armature. The edges of the pole-pieces are preferably curved away from the armature for the purpose of preventing a bunching of the lines of force. The coils for the field-magnet are wound in any suitable manner and slipped over the pole-pieces or cores, and are held in position by screws $g$. This construction permits any coil to be removed by simply removing the screws from that particular core, provided the armature is not in position. When the wrought-iron cores are used, the coils are placed upon them before they are placed in the frame, and they may therefore be readily taken out without removing the armature.

It has been proposed heretofore to bind all the coils in position by two bands or rings passing around the ends of the cores. This construction, however, requires that the bands, which are fastened by screws to each core, shall both be removed whenever any one coil is to be replaced.

Any suitable form of armature may be employed in this machine; but the most desirable form which we have devised will here be described. It consists of successive plates of thin rolled iron placed side by side and separated from each other by non-magnetic material.

In the drawings, $hh$ represent the thin plates, and $h'h'$ the laminæ of non-magnetic material. These latter are preferably thin sheets of paper pasted or glued to the plates. In building the armature large sheets or disks of thin rolled soft iron are first covered with paper upon one side, and then stamped out to the required size and shape. Each plate is preferably constructed with a number of holes, $ii$, for the purpose of ventilation, and with a central hole, which is designed to receive the shaft of the machine. The plates thus prepared are laid against each other, the paper surface of one plate lying upon the exposed surface of the next plate, and so on. The holes $ii$ correspond in position, so that the entire armature has a number of holes passing entirely through it. The alternate plates may have holes of different sizes, and thus expose a large amount of surface for radiating heat. The plates are bound against each other and held in position by end plates or rings $K'K'$, of considerable thickness. Re-enforcing plates $T'$ and $T^2$ are applied outside the plates $K'K'$.

The entire armature is clamped upon the armature-shaft K by a collar, $k^2$, and nut $k^3$. Holes $k$, corresponding to the holes $i$, are formed in the end plates, although they may with advantage be of less diameter for the purpose of leaving the plates as stiff as possible. This construction is of advantage, in that it allows a constant stream of air to pass through the armature and prevents overheating. It should be observed that the amount of heat-radiating surface is largely increased by the use of holes through the armature.

For the purpose of forcing the air through the armature, end plates $t$ and $t^2$ are placed at the openings at the respective ends of the armature. The plate $t$ at one end of the armature is fastened to the armature at its center, but flares outward toward the edge, leaving a space about the openings $k$. Division-walls $t'$ $t'$ preferably intervene between the openings. The plate $t^2$ is fastened to the other end of the armature at its outer edge and stands out from the central portion. An opening of greater diameter than the shaft being left at the center of the plate, a space is left admitting air to the holes $k$. The two plates thus combine to force constant currents of air through the interior of the armature when the machine is in operation. A plate, T, preferably covers the outer portion of the end of the armature carrying the plate $t$.

The coils are wound upon the armature-surface in the following manner: Non-magnetic plates or strips $m m$ are secured to its periphery, and at the ends of these plates overhanging non-magnetic clips or plates $m' m'$ are secured to the sides of the armature. In practice it is found that by the employment of non-magnetic lugs a more even operation of the armature is secured. When magnetic lugs are employed, there is a great strain exerted as the lugs come opposite the polar projections, and it is difficult to prevent the armature from binding. The coils are then wound across the face and around the sides of the armature, thus surrounding the strips $m$ and passing under the ends of the plates $m'$, filling up the spaces between the strips. In practice it is found that one or two layers of wire thus applied give very satisfactory results. For the purpose of shielding the wire from the edge of the plates, and also avoiding the necessity of bringing the binding-plates to the outer edge of the armature, rings $o' o^2$ are placed at the edges of the armature and flush with its periphery. The corners of these rings are rounded off to prevent too sharp an angle in the wire. The rings $o' o^2$, and likewise the plates $m'$ and strips $m$, are preferably of vulcanized fiber or other suitable non-magnetic and non-conducting material.

It is sometimes desirable to cover the wire at the ends of the armature with a non-conducting protective covering, and therefore the clips $m'$ may be made in two parts, as shown in Fig. 4, so that the overhanging portion $m^2$ may be temporarily removed after the armature is wound, while a plate or sheet of vulcanized fiber, for instance, is placed upon the wires.

Thin sheets of mica, $j$, cover the surface of the armature to better insulate the wire therefrom, and after the wire is wound in position the entire surface is covered with mica or other suitable insulating material. In this manner the wire of the armature-coils is entirely incased and thoroughly insulated from surrounding objects and protected. Mica is especially advantageous for the reason that it is not affected by heat and moisture. Belts of wire, $j'$, are preferably wound upon the face of the armature to securely bind the parts in position.

The precise method of winding the wire upon the armature may be somewhat modified; but it is preferred, instead of winding from one end to the other continuously, to apply it in such a manner as to prevent the ends which carry the highest and lowest potential from being near each other. It is evident that if the wire leading to one commutator-plate is adjacent to that leading to the other commutator-plate a very high difference of potential will exist, and this is in some instances sufficient to cause a spark across the two wires. To avoid this defect, it is preferred to wind the coils in a double manner, as shown in the diagram, Fig. 6. The two ends $v' v^2$ of these wires, which are designed to deliver currents of like polarity, start from points adjacent to each other and are wound upon opposite sides of the armature, and the other ends, $v^3$ and $v^4$, meet at the opposite side. In this manner points of like potential are near each other, and the danger of cross connections being formed is lessened. The special method of winding and connecting the coils is embodied in an application for Letters Patent filed by O. B. Shallenberger.

It has been the practice until recently to make the divisions between the coils of wire of the same width as the faces of the armature-cores, and these have been approximately equal to the width of the faces of the cores of the field-magnet. In practice it is found that a certain advantage is secured by making the divisions of wire wider than the faces of the field-magnet cores. This is due to the induced effect or retardation of the current in the cores of the armature. It will be evident that were there no retardation the current commencing at the time the coil comes opposite the first edge of the core would rise to its maximum at the moment the entire face of the core was confronted or covered by the wire, and from this point it would fall; but, owing to the retardation, the current does not reach its possible maximum at the moment it comes into this position, and it would increase still further were it not that in machines having coils of equal width with the pole-pieces the current must necessarily fall as the wire passes from the further edge out of the field. By constructing the coil of greater width, however, this latter effect is not produced, because the number of convolutions cutting the lines of force do not change immediately and the current has time to rise to its full value, whereupon the last edge of the coil passes across the first edge of the pole-piece and the current begins to fall.

The bearings which it is preferred to use for the armature are ball-bearings, for these serve to center the machine automatically. They are constructed with the bearing-surface in the portions $A'$ $A^2$ of the casting, and are covered by sections $a^3$ $a^4$, screwed or bound in position by screws or bolts $b^7$. By removing these sections and the casting $B^2$ the shaft may be lifted from the bearings. Suitable oil-cups, $r'$, are provided, and preferably drip-cups $r^2$ $r^3$ are provided with pipes leading to receiving-tanks $r^4$ $r^5$, into which the oil escapes as it passes from the bearings. To prevent the oil which may overflow from the cups $r'$ from running down upon the commutator-brushes and brush-holders, wide cups or pans S surround the pipes $s'$, into which the cups $r'$ are screwed. These serve to catch the oil, and from them it escapes through pipes or tubes into the tube $s'$.

The ball-bearings are conveniently constructed by making the ball-bushes $n'$ $n^2$ separate from the casting or split bushes $n^3$ $n^4$. The tube or pipe $s'$ then extends through the upper section, $n^3$, of the split bush and into the section $n'$ of the ball-bush. In this manner it serves to prevent the ball-bushes from revolving.

We claim as our invention—

1. The combination, substantially as described, with the armature of an electric machine, having openings extending through it, of conical or bell-shaped ventilating-plates at the respective ends of the armature, the plate at one end flaring away from the armature-core and that at the other end flaring toward the armature-core.

2. In an electric machine, a rotating armature having one or more axial openings, in combination with ring-shaped end plates, one of said plates affording an opening to the armature-openings through its central portion, and the other flaring away from the armature-core and affording an opening to the armature-openings from its outer edge, substantially as described.

3. In an electric machine, the combination, with an armature having one or more axial openings through it, of a plate applied to one end, partially covering the opening or openings and continuing them toward the periphery of the armature.

4. In an electric machine, the combination, with a rotating armature having axial openings through it, of an end plate covering the openings and radiating ribs on the inner surface of said plate, forming with said plate radial continuations of said openings.

5. In an electric machine, the combination, with a cylindrical armature-core and coils of wire applied thereto, of a sheet of mica or other non-inflammable and non-volatilizable insulating material between the wire and the core, and a continuous insulating coating of the same material surrounding all the coils and core after the coils are applied to the core, substantially as described.

6. In an electric machine, the combination, with the armature-core and its bobbins, of a continuous coating of mica or other non-inflammable and non-volatilizable insulating material incasing all the coils after they are applied to the core, substantially as described.

7. An armature for an electric machine constructed from thin plates of soft iron clamped together, independent non-magnetic lugs extending entirely across the face of said armature and fastened thereto, and coils of wire wound flat upon the face of the armature in the spaces intervening between the non-conducting lugs.

8. An armature for electric machines cylindrical in form, independent lugs of non-magnetic material fastened upon its outer surface and extending from end to end, clips or plates of non-magnetic material at the respective ends of said lugs, and wire wound around said clips and flat upon the face of the armature through the spaces between the lugs, substantially as described.

9. An armature for electric machines, composed of thin sheets of soft iron and thin sheets of paper or other electrically-insulating material pasted against one face of each sheet of metal.

10. An armature for electric machines, consisting of thin sheets of soft iron and thin sheets of paper or other electrically-insulating material pasted against one surface, each plate and the paper pasted thereto having holes stamped therein, substantially as described.

11. In an electric machine, an armature cylindrical in form constructed with coils wound across its face and down upon its ends, and plates of non-conducting material covering the wire upon the ends, substantially as described.

12. In an electric machine, a cylindrical armature having its coils wound upon its face and down upon its ends, overhanging clips at the ends for holding the coils in position, constructed in two portions, the overhanging portions being removable after the coils are in position, and plates of non-conducting material covering the wire upon the ends of the armature.

13. An armature for electric machines, constructed of plates of soft iron placed side by side and non-conducting sheets filling the spaces between the plates, each plate and the corresponding non-conducting sheet having one or more ventilating-holes, combining to form continuous ventilating-holes through the armature, open only at the ends of the armature.

14. In an electric machine, an armature-core constructed with axial ventilating-openings having end plates constructed with corresponding openings of less cross-section.

In testimony whereof we have hereunto subscribed our names this 27th day of October, A. D. 1886.

GEO. WESTINGHOUSE, JR.
HENRY M. BYLLESBY.
OLIVER B. SHALLENBERGER.
ALBERT SCHMID.
BERNARD HARTLEY.

Witnesses:
CHARLES A. TERRY,
WALTER D. UPTEGRAFF.